Figure 1:
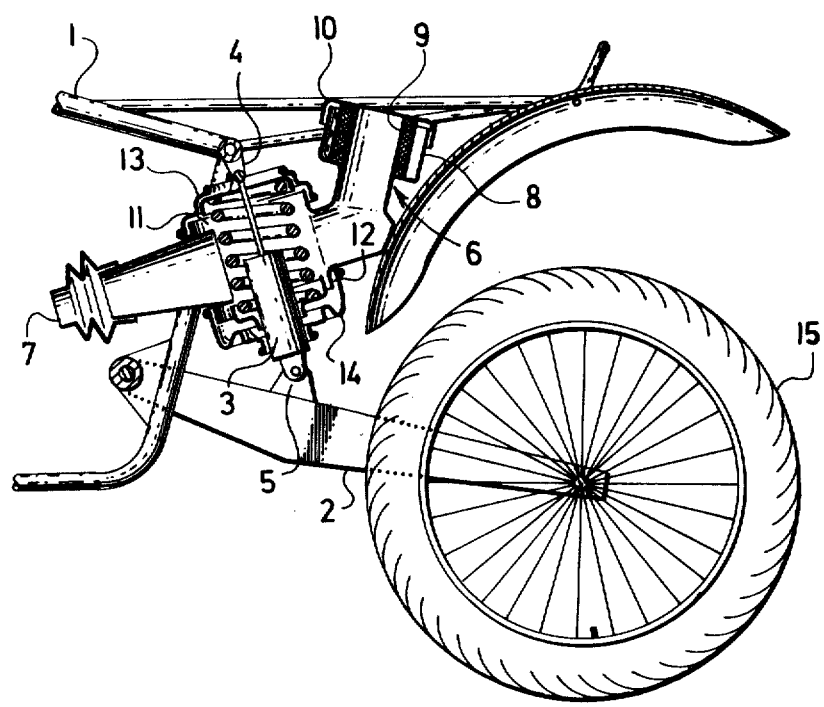

United States Patent [19]

Pudil et al.

[11] 4,412,596
[45] Nov. 1, 1983

[54] SPRING SUSPENSION FOR THE BACK WHEEL OF A MOTORCYCLE

[75] Inventors: Frantisek Pudil; Jaromir Trhlik, both of Strakonice, Czechoslovakia

[73] Assignee: Ceske zavody motocykove, narodni podnik, Strakonice, Czechoslovakia

[21] Appl. No.: 292,734

[22] Filed: Aug. 14, 1981

[51] Int. Cl.³ .............................................. B62K 25/28
[52] U.S. Cl. ................................. 180/227; 55/385 B; 180/219
[58] Field of Search ............... 280/284; 180/219, 225, 180/227; 55/385 B, DIG. 28

[56] References Cited

U.S. PATENT DOCUMENTS

| | | | |
|---|---|---|---|
| 3,877,539 | 4/1975 | Tilkens | 180/227 |
| 4,319,657 | 3/1982 | Nomura | 180/219 |
| 4,321,978 | 3/1982 | Tominaga et al. | 180/225 |
| 4,327,930 | 5/1982 | Tominaga et al. | 180/227 |

Primary Examiner—Joseph F. Peters, Jr.
Assistant Examiner—Donn McGiehan

[57] ABSTRACT

Springing and damping of a back wheel of a motorcycle. Hithereto known embodiments of springing of the back wheel have a springing and damping member situated in an open area; this causes its insufficient cooling as well as its exposure to dust and impurities. The springing and damping device of the invention is located in a part of the closed suction area of the engine between an entrance filter element and a discharge branch for connecting a carburetor to it. The entrance zone of the springing and damping member into the suction area, as well as its exit out of the suction area, are sealed with elastic boots. The springing and damping member may be covered with an aerodynamically shaped cover. One or two springing and damping members may be situated at a wall of the closed suction area.

4 Claims, 3 Drawing Figures aerodynamic cover

SPRING SUSPENSION FOR THE BACK WHEEL OF A MOTORCYCLE

This invention relates to a spring suspension for the back wheel of a motorcycle which is provided with a swinging fork, the suspension having a springing and damping member disposed between the swinging fork and the frame of the motorcycle.

In hitherto known spring suspensions for the back wheel of a motorcycle provided with a rear swinging fork, the springing and damping member is disposed in an open area of the motorcycle. The springing and damping member, which is usually a hydraulic telescopic damper with a spring or a hydraulic pneumatic telescopic damper, is usually located on both sides of the back swinging fork between the motorcycle seat and the fork, and behind the engine, or when only one so-called central springing unit is employed, such unit bears against the back swinging fork and usually protrudes into an area under the fuel tank and over the engine of the motorcycle.

A common drawback of both the above prior art embodiments resides in a poor and insufficient cooling of the hydraulic telescopic damper, or of a phemuatic or hydraulic-pneumatic springing unit, which may be provided with accessories, such as auxiliary tanks. But good cooling is very important for a satisfactory functioning of the spring suspension, especially in more highly stressed motorcycles, such as motorcycles designed for cross-country races and competitions. Drawbacks related to the dimensions of the space needed for the hitherto known embodiments of spring suspensions are very important as well.

The invention has as one of its objects the overcoming of at least some of the above mentioned drawbacks of the prior art. In accordance with the invention, a springing and damping member passes through or is located in a part of a suction area of the engine between an air filter element and a branch for connecting the air intake to a carburetor. The entrance of the springing and damping member into the suction area, as well as the exit thereof from the suction area, are packed with an elastic packing. The springing and damping member may be covered with a cover of aerodynamic design. One or two springing and damping members may be disposed at the wall of the suction area.

The springing and damping arrangement in accordance with the invention is advantageous especially because of the fact that it enables an intensive cooling of the springing and damping member by means of a flow of air being sucked into the engine. Another advantage resides in the fact that the piston rod of the springing and damping member is located in an area of perfect cleanliness, since it as well as the whole surface of the springing and damping member are situated in the suction area of the engine downstream of the air filter element, so that it is subjected to air which has been cleaned and filtered. The solving of space problems is also important, since, when employing an embodiment according to the invention, the back part of the motorcycle is narrower so that one saves both material and weight. A dynamic stressing of the motorcycle, that is, of the frame thereof, is advantageous, as well as the location and affixing of the springing and damping member. An advantage of the design is that a filter, suction damper, springing and damping member, or members, are not in the way when designing the other parts of the motorcycle; also, the springing and damping arrangement according to the invention permits a sufficiently high lifting of the back wheel of the motorcycle during the springing of such back wheel.

Figure 2:
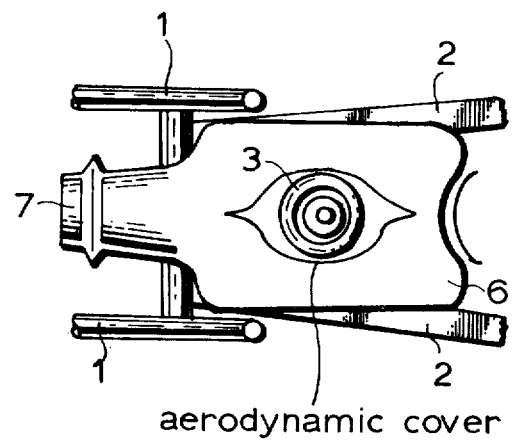
Figure 3:
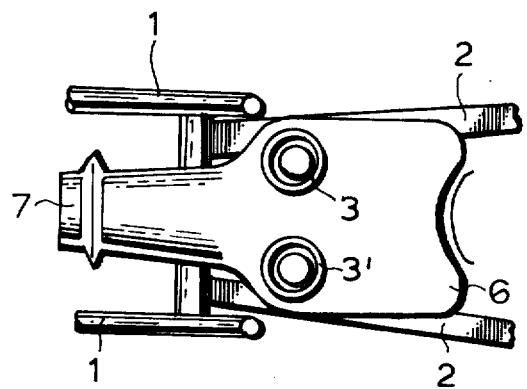

In order that the invention may be clearly understood and readily carried into effect, a preferred embodiment thereof is shown in the accompanying drawing, wherein:

FIG. 1 of the drawing is a schematic longitudinal section of a part of the suction area of an engine, such figure also showing a back frame of the motorcycle including the back swinging fork and the swinging and suspension arrangement for the back wheel thereof FIG. 2 is a fragmentary view in plan of a first alternative arrangement in accordance with the invention; and FIG. 3 is a fragmentary view in plan of a second alternative arrangement in accordance with the invention.

Turning now to FIG. 1 of the drawing, a back swinging fork 2 for a back wheel 15 of a motorcycle is connected to the frame 1 of the motorcycle. A springing and damping member 3 is connected to the frame 1 by means of an upper pivotal connection 4 and to the swinging fork 2 by means of a lower pivotal connection 5. An engine intake suction area 6 with an appropriate enclosure is provided at its outlet end 7 which is adapted to be connected to a carburetor (not shown) or a fuel injection device (also not shown) and at its other, inlet end is provided with an air filter element 9 in a suction branch 8 for cleaning the intake air for the engine. The filter element is affixed to the suction branch 8 by an appropriate clamping means 10. The springing and damping element 3 for the rear or back swinging fork 2 of the motorcycle is disposed in a part of the enclosed suction area 6 of the engine (not shown) of the motorcycle between the intake filter 9 and the outlet 7 of such enclosure. The lower end of the springing and damping element 3 is surrounded by a sealing means in the form of a flexible boot 14, whereas the upper end of the springing and damping element 3, at the upper end of the piston rod thereof connected to the pivot means 4, is also provided with a sealing means in the form of a flexible boot 13. Thus the springing and damping member 3 is perfectly sealed within the intake air suction area 6, while the member 3 is permitted the requisite swinging and longitudinal expansion and contraction during operation. As shown, the back wheel 15 of the motorcycle is mounted for rotation in the rear end of the back swinging fork 2.

In another, embodiment of the invention shown in FIG. 2, the springing and damping member 3 is covered with an aerodynamically shaped cover for a better air flow about the suction area 6.

It is also evident that in case of an asymmetric arrangement of suction member 6, one springing and damping area 3 may be situated at one side wall of the suction area 6. Analogously, in case two springing and damping members 3 are employed as shown in FIG. 3, they may be situated at the respective walls of the suction area 6.

Although the invention is illustrated and described with reference to one preferred embodiment thereof, it is to be expressly understood that it is in no way limited to the disclosure of such preferred embodiment, but that it is capable of numerous modifications within the scope of the appended claims.

We claim:

1. A springing and damping arrangement for the back wheel of a motorcycle provided with a back swinging fork for the mounting of the rear wheel thereof, comprising a springing and damping member disposed between the back swinging fork and the frame of the motorcycle, the springing and damping member passing through a part of an enclosed air intake suction area for the engine between a filter element at the intake end thereof and a discharge branch for connecting a carburetor for the engine thereto, and flexible means sealing the respective ends of the springing and damping member at the motorcycle frame and the back swinging fork thereof to the respective portions of the means which encloses the suction area for the engine.

2. A springing and damping arrangement for the back wheel of a motorcycle as in claim 1, wherein the springing and damping member is provided with an aerodynamically shaped cover.

3. A springing and damping arrangement for the back wheel of a motorcycle as in claim 1, wherein the springing and damping member is disposed adjacent the wall of the suction area.

4. A springing and damping arrangement for the back wheel of a motorcycle as in claim 1, wherein there are two springing and damping members, said members being disposed adjacent respective opposite walls of the suction area.

* * * * *